United States Patent [19]

Kluepfel et al.

[11] 3,928,572

[45] Dec. 23, 1975

[54] MYRIOCIN AND PROCESS OF PREPARATION

[75] Inventors: Dieter Kluepfel, Montreal; Alicia Kudelski, Westmount; Jehan Bagli, Kirkland, all of Canada

[73] Assignee: Ayerst Mckenna and Harrison Ltd., Montreal, Canada

[22] Filed: Feb. 11, 1971

[21] Appl. No.: 114,445

[52] U.S. Cl. .................................. 424/122; 195/81
[51] Int. Cl.² .................................... A61K 35/00
[58] Field of Search ....................... 424/122; 195/81

[56] References Cited
UNITED STATES PATENTS 3,464,891  9/1969  Norris et al. .......................... 424/122

*Primary Examiner*—Jerome D. Goldberg

[57] ABSTRACT

There is disclosed herein myriocin, an antibiotic obtained by culturing Myriococcum albomyces NRRL 3858, extracting it from the cultures thus obtained, and purifying by crystallization. Myriocin is useful as an anti-fungal agent, and a process for its preparation and methods for its use are also disclosed. Myriocin is trans-2-amino-3,4-dihydroxy-2-(hydroxymethyl)-14-oxo-6-eicosenoic acid.

4 Claims, 1 Drawing Figure

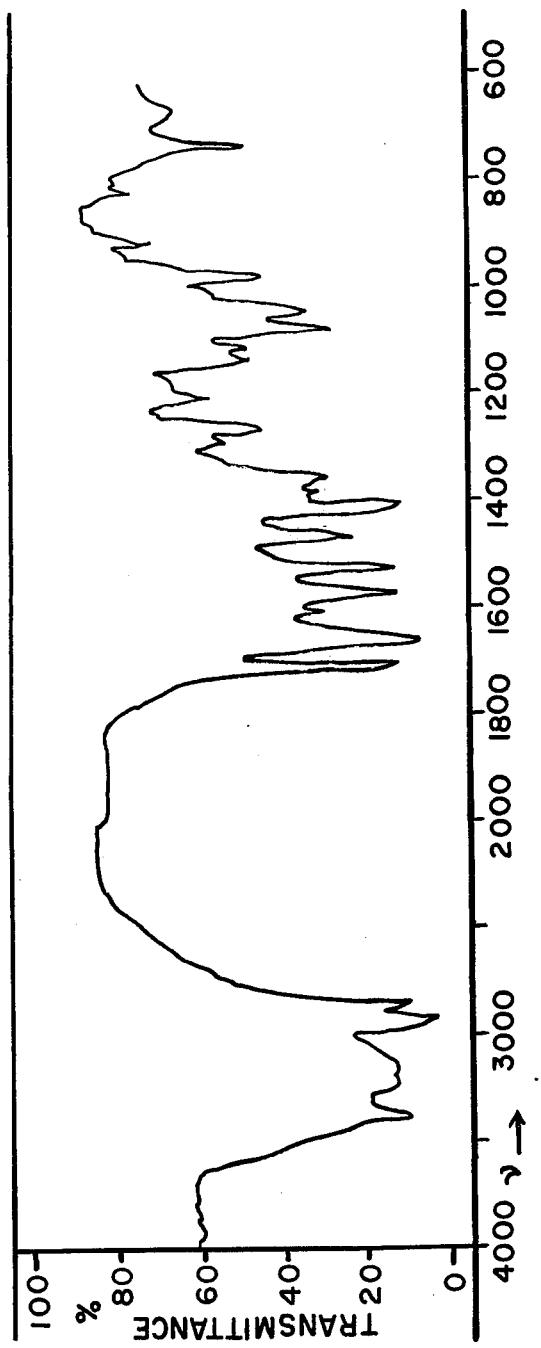

MYRIOCIN AND PROCESS OF PREPARATION

BACKGROUND OF THE INVENTION

This invention relates to a new composition of matter, and to a process for its preparation. More particularly, this invention relates to a new compound, myriocin, to a simple and efficient process of preparing said compound, and to pharmacologically useful compositions thereof. Myriocin is a chemical compound, trans-2-amino-3,4-dihydroxy-2-(hydroxymethyl)-14-oxo-6-eicosenoic acid having the structural formula

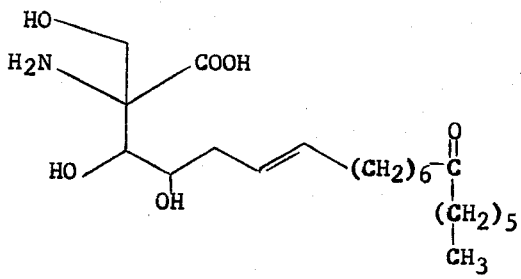

which is producible by culturing a myriocin-producing thermophilic fungus in an aqueous nutrient medium. Thermophilic fungi are well known to those skilled in the art and many of them have been thoroughly described and characterized, as shown, e.g., in D. G. Cooney and R. Emerson "Thermophilic Fungi," W. H. Freedman & Co., San Francisco and London 1964. Their natural habitat is most commonly found in accumulations of decaying organic matter mainly of plant origin and occasionally also of animal origin such as, e.g. in compost heaps. It would seem that despite inherently interesting characteristics of thermophilic fungi such as, e.g. the unusually high temperatures at which they prefer to grow, no particularly interesting metabolites produced by them have been found to date. It is therefore all the more surprising that myriocin, the subject of this invention, possesses valuable antibiotic activities, especially against certain pathogenic fungi.

SUMMARY OF THE INVENTION

Myriocin is obtained by culturing certain thermophilic fungi, especially certain strains of Myriococcum albomyces in an aqueous mixture containing sources of assimilable carbon and nitrogen and essential minerals. The strain of Myriococcum albomyces preferred for the production of myriocin has been deposited with the Northern Utilization and Research Division, Agricultural Research Service, U.S. Department of Agriculture, Peoria, Illinois, U.S.A., under the number NRRL 3858. Prior to the issuance of this Application the strain of Myriococcum albomyces is available under the conditions specified in Rule 14, and it is available to the public upon request when this Application issues as a Patent.

Myriocin may be isolated from the culture medium by filtration and washing of the mycelial growth, extraction of the filtered "beer" with a sparingly water-soluble solvent for myriocin, for example a straight-chain lower alkanol containing 4 – 6 carbon atoms, preferably n-butanol, and precipitation with a substantially water-insoluble solvent miscible with the particular lower alkanol used above, preferably diethyl ether. The crude myriocin obtained in this manner may be purified, if desired, e.g. by counter-current distribution between two solvent phases such as, e.g. mixtures of lower alkanols such as methanol, ethanol, or n-propanol and water as the upper phase and mixtures of halogenated hydrocarbons such as chloroform or methylene chloride and lower aliphatic esters such as methyl or ethyl acetate as the lower phase. Further purification may then be effected, e.g. by crystallization from a lower alkanol, preferably methanol.

Alternatively, the mycelial growth may be filtered as described above and extracted with a lower alkanol such as methanol or ethanol. Evaporation of the alkanolic extracts and crystallization of the residue from a lower alkanol, preferably methanol, yields myriocin. Myriocin isolated and purified as described above is characterized by the infrared spectral absorption curve shown in FIG. 1.

Myriocin is inactive against a number of gram-positive and gram-negative bacteria such as Staphylococcus pyogenes (both penicillin-resistant and penicillin-sensitive strains), Sarcina lutea, Streptococcus fecalis, Escherichia coli, Aerobacter aerogenes, Salmonella pullorum, Pseudomonas aeruginosa, Proteus mirabilis, and Proteus vulgaris. However, when tested by standard procedures, for example by procedures described in "Antiseptics, Disinfectants, Fungicides, and Chemical and Physical Sterilization," Lea & Febiger, Philadelphia 1957, myriocin has been found to inhibit the growth of certain pathogenic fungi such as, for example, Candida albicans, Microsporum gypseum, Trichophyton granulosum, and Trichophyton mentagrophytes. This inhibitory activity of myriocin is especially pronounced against Candida albicans, and said last-named organism may advantageously be used for assay purposes. Myriocin is a potent anti-fungal agent and, as such, may be used to clean and disinfect laboratory equipment, surgical instruments, locker rooms, or shower rooms of sensitive fungus organisms. For such purposes it is preferred to use 0.1 – 0.5 percent solutions of myriocin in a lower alkanol, preferably methanol, diluted with 10 – 100 volumes of water containing 0.001 – 0.1 percent of a non-ionic surface-active agent such as e.g. oleate esters of sorbitol and its anhydrides copolymerized with ethylene oxide ("Polysorbate 80 U.S.P.") immediately before applying it to the objects to be cleaned and disinfected.

DETAILED DESCRIPTION OF THE INVENTION

More specifically, myriocin may be prepared and purified in the following manner.

A solid culture medium containing 1–10 g/l, preferably 5 g/l, of a pancreatic digest of casein ("Trypticase," Baltimore Biological Laboratory, Baltimore, Md.), 1–10 g/l, preferably 5 g/l, of peptone (Difco), 5–50 g/l, preferably 20 g/l, of glucose ("Cerelose"), and 5–50 g/l preferably 20 g/l of agar, made up to one liter with tap water, is inoculated with a soil stock of Myriococcum albomyces NRRL 3858 and incubated at 50°–55°C, preferably at 52°C for 5–10 days, preferably for 7 days. The organism sporulates under those conditions, the spores are harvested by adding distilled water, preferably one half volume per volume of culture medium, and agitating, thus obtaining a suspension of spores of Myriococcum albomyces NRRL 3858.

Said spore suspension in amounts of from 1–5 percent, preferably 2 percent of the final volume, is added to a liquid culture medium containing 5–15 g/l, preferably 8 g/l of cane molasses; 5–50 g/l, preferably 15 g/l, of malt extract (Difco); 5–50 g/l, preferably 10 g/l of glycerol; 1–10 g/l, preferably 5 g/l of yeast extract (Difco); 1–7 g/l, preferably 5 g/l of sodium chloride, 0.05–0.5 g of magnesium sulfate and zinc sulfate, 1–10 ml/l, preferably 5 ml/l of an anti-foaming agent such as e.g. sperm oil, and tap water to make one liter of culture medium. The pH of the medium is adjusted to 6.0–7.0, preferably 6.4–6.5. The inoculated mixture is incubated with agitation, e.g. by shaking or stirring, at 40°–55°C, preferably at 47°C, for 4–7 days, preferably for 5 days.

The fermentation mixture is periodically assayed for myriocin, using Candida albicans as the test organisms on solid Sabouraud's medium (Baltimore Biological Laboratory, Baltimore, Md.) at 37°C for 18 hours, by the filter paper disk agar diffusion method or the cylinder-plate method. The first method is used for purposes of rough estimation of relative potencies. The second method is used for accurate determinations and is based upon crystalline myriocin giving a uniform spot on thin layer chromatographic plates. A standard curve is prepared and shows a straight line relationship between the logarithm of the dose and the diameter of the inhibition zone measured in millimeters.

At the end of the incubation period, as determined by maximal inhibitory activity of the fermentation mixture against Candida albicans, the mixture is filtered, the filter cake washed with water, and the filtered "beer" extracted with a sparingly water-soluble lower alkanol, preferably n-butanol. The alkanolic extracts are evaporated to a small volume, preferably under reduced pressure, and precipitated by addition of a substantially water-immiscible solvent miscible with the respective lower alkanol, preferably diethyl ether. The crude myriocin thus obtained is most conveniently purified by counter-current distribution from a pair of solvent mixtures consisting of a lower alkanol and water as the upper phase, and a halogenated hydrocarbon and an aliphatic lower alkyl ester as the lower phase. A preferred mixture consists of methanol-water (1:1 vol/vol) as the upper phase and chloroform-ethyl acetate (1:1 vol/vol) as the lower phase, both phases being used in equal amounts. Myriocin accumulates in a certain zone of the counter-current tube transfer system and is isolated by evaporation and crystallization. For example, in the preferred solvent system described above myriocin accumulates in a zone with its maximum at about one eighth of the total distance of migration is isolated by evaporation of the contents of the tubes containing maximal amounts, and purified by recrystallization from a lower alkanol, preferably methanol.

Alternatively, the mycelial growth obtained as described above is filtered, extracted several times with a lower alkanol, preferably methanol, and the extracts are evaporated to a small volume, preferably under reduced pressure. Cooling of the above concentrate yields crude crystalline myriocin.

Crude crystalline myriocin obtained as above assays for a minimum inhibitory concentration against Candida albicans of about 10–20 mcg/ml.

Purified myriocin is a colourless crystalline compound with m.p. 183°–184°C, with the empirical formula $C_{21}H_{39}O_6N$ (mol. wt. 401) determined by analysis, as follows. Calc. for $C_{21}H_{39}O_6N$: C, 62.81; H, 9.79; N, 3.49% Found: C, 62.99; H, 9.72; N, 3.37%

Myriocin shows a uniform spot on thin layer plates of silica gel G (E. Merck A. G., Darmstadt) developed with a mixture of chloroform (40 vols.), ethanol (33 vols.), glacial acetic acid (10 vols), and water (10 vols.). This product shows a minimum inhibitory concentration against Candida albicans of 4 mcg/ml.

It exhibits optical rotation $[\alpha]_D^{25} + 10.3°$ (c = 0.386 percent, methanol) and shows no characteristic absorption in the ultraviolet region from 220–400 m$\mu$.

Myriocin exhibits in its mass spectrum the highest ion peak at m/e = 383. This may be attributed to the loss of one molecule of water from the molecule of myriocin during mass spectrography.

The infrared absorption spectrum of myriocin pelleted in potassium bromide is reproduced in FIG. 1 and shows characteristic absorption bands at 3390, 3230 and 3160 cm$^{-1}$ (all three strong) denoting the presence of an amino group and a hydroxyl group; two bands of strong intensity at 2930 and 2860 cm$^{-1}$; and two bands (both strong) at 1706 and 1660 cm$^{-1}$ denoting the presence of carbonyl groups.

Further infrared absorption bands are characterized by the following data given in reciprocal centimeters, with (s) denoting a strong, (m) denoting a medium, and (w) denoting a weak intensity band. This classification is arbitrarily selected in such a manner that a band is denoted as strong (s) if its peak absorption is more than 2/3 of the background in the same region; medium (m) if its peak is between 1/3 and 2/3 of the background in the same region; and weak (w) if its peak is less than 1/3 of the background in the same region.

| | |
|---|---|
| 1600 cm$^{-1}$ (m) | 1072 cm$^{-1}$ (s) |
| 1567 cm$^{-1}$ (s) | 1040 cm$^{-1}$ (m) |
| 1530 cm$^{-1}$ (s) | 1010 cm$^{-1}$ (w) |
| 1405 cm$^{-1}$ (s) | 999 cm$^{-1}$ (w) |
| 1285 cm$^{-1}$ (m) | 970 cm$^{-1}$ (m) |
| 1262 cm$^{-1}$ (m) | 950 cm$^{-1}$ (w) |
| 1198 cm$^{-1}$ (m) | 905 cm$^{-1}$ (w) |
| 1169 cm$^{-1}$ (w) | 838 cm$^{-1}$ (w) |
| 1128 cm$^{-1}$ (m) | 813 cm$^{-1}$ (w) |
| 1102 cm$^{-1}$ (m) | 801 cm$^{-1}$ (w) |
| | 672 cm$^{-1}$ (m) |

The presence of an amino group in myriocin shown by infrared absorption spectrography is confirmed by a positive ninhydrin test.

Myriocin is soluble in methanol, somewhat less soluble in ethanol, slightly soluble in t-amyl alcohol, and substantially insoluble in water, ether, chloroform, and ethyl acetate.

The following Examples will illustrate this invention.

EXAMPLE 1 a. A soil stock of Myriococcum albomyces NRRl is used to inoculate a series of Roux bottles containing each 200 ml of a solid medium consisting of the following ingredients:

| | |
|---|---|
| Pancreatic digest of casein ("Trypticase",Baltimore Biological Laboratory, Baltimore, Md) | 5 g/l |
| Peptone (Difco) | 5 g/l |
| Glucose (Cerelose) | 20 g/l |
| Agar | 20 g/l |
| Tap water to make 1 liter | |
| The pH is adjusted to 5.7. | |

The bottles are incubated at 52°C for a period of 7 days. From these cultures a spore suspension is prepared by adding 100 ml of sterile distilled water and scraping the surface with a sterile spatula, and 2 ml portions of this spore suspension are used to inoculate 500 ml Erlenmeyer flasks each containing 100 ml of the following liquid medium:

| | |
|---|---|
| Cane molasses ("blackstrap") | 8 g/l |
| Malt extract (Difco) | 15 g/l |
| Glycerine | 10 g/l |
| Yeast extract (Difco) | 5 g/l |
| NaCl | 5 g/l |
| MgSO$_4$. 7 H$_2$O | 0.5 g/l |
| ZnSO$_4$. 7 H$_2$O | 0.1 g/l |
| Sperm oil | 5 ml/l |
| Tap water to make 1 liter | |
| The pH is adjusted to 6.4 to 6.5. | |

The flasks are incubated at 47°C for 120 hours on a New Brunswick gyratory shaker operating at 240 rpm. Assays are conducted against Candida albicans on solid Sabouraud's medium (Baltimore Biological Laboratory, Baltimore, Md). The plates are incubated at 37°C for 18 hours, and zones of inhibition measured in millimeters.

b. The fermentation broth is filtered on a Buchner funnel and the mycelial cake washed with one-tenth volume of water which is added to the filtrate. The filtrate is extracted twice with equal volumes of n-butanol. The butanol extract is concentrated to a small volume and precipitated in ethyl ether to obtain crude myriocin.

Alternatively, the mycelial filter cake is washed several times with methanol, the methanolic extracts are combined and concentrated under reduced pressure to a small volume. Crude myriocin crystallizes upon cooling.

c. The crude myriocin obtained by butanol extraction is purified by counter current distribution using a Quickfit Steady State apparatus. The solvent system used for the separation consists of a mixture of equal parts by volume of methanol, water, chloroform, and ethyl acetate.

After 100 upper and 100 lower phase transfers myriocin accumulates in a zone with tube −25 as maximum (K = 0.6). Myriocin is obtained by collecting these fractions and evaporating the solvents under reduced pressure whereupon the product crystallizes from the methanolic water concentrate. It is recrystallized from methanol.

The crude myriocin obtained by methanol extraction of the mycelial growth is purified by repeated recrystallization from methanol, dissolving 2 grams in 100 ml methanol, concentrating to about 60 ml and storing overnight at 4°C. Colourless crystalline material is obtained which is removed by filtration and dried under reduced pressure, to yield myriocin which gives a uniform single spot on thin layer chromatography plates (silica gel G, E. Merck A.G., Darmstadt), and with m.p. 183°–184°C.

EXAMPLE 2

The inoculum is prepared as in Example 1 and 2 ml of spore suspension are used to inoculate 500 ml Erlenmeyer flasks containing 100 ml of the following medium:

| | |
|---|---|
| Enzymatic digest of casein "NZ amine B" (Sheffield Chemical, Norwich, New York) | 5 g/l |
| Yeast extract (Difco) | 2 g/l |
| Enzymatic hydrolyzate of soybean meal ("Soytone", Difco) | 2 g/l |
| Soluble starch | 10 g/l |
| Mannitol | 5 g/l |
| Mg SO$_4$. 7 H$_2$O | 0.2 g/l |
| FeSO$_4$. 7 H$_2$O | 0.01 g/l |
| Carboxymethyl cellulose | 5 g/l |
| Tap water to make 1 liter | |
| The pH is adjusted to 7.2. | |

The flasks are incubated at 47°C for 36–42 hours on a rotary shaker operating at 240 rpm.

1.7 l of these fermentation broths are used to inoculate 84 liters of the same liquid medium as described in Example 1 in a pilot plant type fermentation vessel. The fermentation is carried out at 47°C with an aeration of 0.3 v/v and an agitation of 250 rpm for a period of 96–170 hours. The loss of volume due to evaporation is corrected by daily additions of sterile water. The pH is controlled and kept between 6.5 and 7.2.

Recovery and purification are carried out as described in Example 1, and crystallization from methanol gives myriocin with m.p. 183°–184°C.

We claim:
1. Myriocin, a compound which
   a. is effective in inhibiting the growth of pathogenic fungi;
   b. is soluble in methanol, somewhat less soluble in ethanol, slightly soluble in t-amyl alcohol, and substantially insoluble in water, ether, chloroform, and ethyl acetate;
   c. has the following elemental analysis: C, 62.99; H, 9.72; N, 3.37 percent;
   d. has an empirical formula C$_{21}$H$_{39}$O$_6$N;
   e. has an optical rotation $[\alpha]_D^{25} + 10.3°$ (c = 0.386 percent, methanol);
   f. does not show any characteristic absorption in the ultraviolet region from 220–400 m$\mu$;
   g. has a characteristic infrared absorption spectrum as shown in FIG. 1 of the accompanying drawing;
   h. has a melting point of 183° to 184°C; and
   i. shows a minimum inhibitory concentration against Candida albicans of 4 mcg/ml.
2. Myriocin, of claim 1 which is trans-2-amino-3,4-dihydroxy -2-(hydroxymethyl)-14-oxo-6-eicosenoic acid having the structural formula

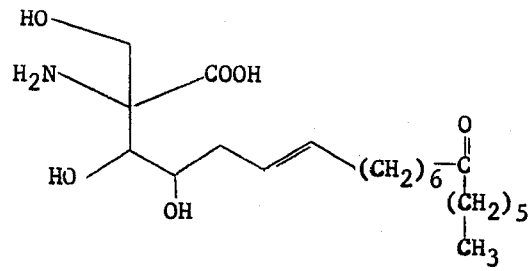

3. A process for the production of myriocin, trans-2-amino-3,4-dihydroxy-2-(hydroxymethyl)-14-oxo-6-eicosenoic acid which comprises culturing a suspension of spores of Myriococcum albomyces NRRL 3858 in an aqueous nutrient medium containing a source of assimilable nitrogen and assimilable carbohydrate under aerobic conditions at a pH between about 6 and 7.2 and a temperature of about 40° to 55°C until substantial anti-fungal activity is imparted to the medium by production of myriocin, and recovering myriocin from the culture medium.

4. A process as claimed in claim 3 in which the recovery is carried out by filtering the fermentation mixture, extracting the mycelial growth with a lower alkanol, evaporating said extract and purifying crude myriocin thus obtained by crystallization.

* * * * *